US006982125B2

(12) United States Patent
LaCourse et al.

(10) Patent No.: US 6,982,125 B2

(45) Date of Patent: Jan. 3, 2006

(54) ALN MATERIAL AND ELECTROSTATIC CHUCK INCORPORATING SAME

(75) Inventors: Brian C. LaCourse, Pepperell, MA (US); Morteza Zandi, Shrewsbury, MA (US); Ara Vartabedian, Hudson, MA (US)

(73) Assignee: Saint-Gobain Ceramics & Plastics, Inc., Worcester, MA (US)

(*) Notice: Subject to any disclaimer, the term of this patent is extended or adjusted under 35 U.S.C. 154(b) by 55 days.

(21) Appl. No.: 10/327,722

(22) Filed: Dec. 23, 2002

(65) Prior Publication Data

US 2004/0121192 A1 Jun. 24, 2004

(51) Int. Cl.

*C05B 35/00* (2006.01)
*B32B 18/00* (2006.01)
*B23B 5/22* (2006.01)
*B23B 31/28* (2006.01)

(52) U.S. Cl. .................... 428/698; 428/469; 428/702; 279/128; 501/98.5

(58) Field of Classification Search ................ 428/469, 428/698, 702, 209; 279/128; 501/98.5

See application file for complete search history.

(56) References Cited

U.S. PATENT DOCUMENTS

| | | | | |
|---|---|---|---|---|
| 4,833,108 | A | 5/1989 | Mizuno et al. | |
| 5,124,284 | A | 6/1992 | Ishida et al. | |
| 5,874,378 | A * | 2/1999 | Ishida et al. | 501/98.4 |
| 5,888,907 | A | 3/1999 | Tomoyasu et al. | |
| 5,998,321 | A * | 12/1999 | Katsuda et al. | 501/98.4 |
| 6,001,760 | A | 12/1999 | Katsuda et al. | |
| 6,017,485 | A * | 1/2000 | Enck et al. | 264/618 |
| 6,486,085 | B1 | 11/2002 | Katsuda et al. | |
| 6,636,413 | B2 * | 10/2003 | Tsuruta | 361/234 |
| 2002/0055021 | A1 * | 5/2002 | Niwa | 428/698 |

* cited by examiner

*Primary Examiner*—Stephen Stein

(74) *Attorney, Agent, or Firm*—Toler, Larson & Abel, LLP

(57) ABSTRACT

An electrostatic chuck is provided which includes a ceramic body comprising aluminum nitride (AlN), and at least one electrode in the ceramic body. According to a particular feature of this embodiment, the aluminum nitride has a resistivity ratio $\rho_{10V}/\rho_{500V}$ less than about 5. In this regard, $\rho_{10V}$ represents the resistivity of the electrostatic chuck at 10 applied volts while $\rho_{500V}$ represents the resistivity of the AlN material at 500 applied volts.

18 Claims, 6 Drawing Sheets

18
20
10
14
12
28
22
24
16

ALN MATERIAL AND ELECTROSTATIC CHUCK INCORPORATING SAME

BACKGROUND

1. Field of the Invention

The present invention relates generally to aluminum nitride-based materials and electrical components produced therefrom. In particular, the present invention relates to aluminum nitride components and electrostatic chucks having improved electrical properties.

2. Description of the Related Art

Electrostatic chucks have been used widely in the semiconductor processing art, particularly for holding silicon wafers (semiconductor wafers) during various processing steps. Such processing steps during semiconductor fabrication typically include deposition (e.g., chemical vapor deposition and physical vapor deposition), etching, cleaning, machining, polishing, packaging, and the like. Such chucks provide various advantages over conventional mechanical clamping systems. For example, mechanical clamps can bow the wafer, generate unacceptable particles, and cause the formation of an exclusion area at the point of clamping. Electrostatic chucks function by generating a clamping force by electrically biasing an embedded electrode with respect to the wafer or substrate being clamped. This electrical biasing or powering generates an electrostatic force between an external electrode and an electrode embedded within the dielectric material forming the chuck body. In certain embodiments, a heating element may be embedded in the chuck body as well.

Although there are several different designs of electrostatic chucks, they can be generally categorized into two groups, depending upon the number of electrodes. Electrostatic chucks with one electrode are often called monopolar or parallel plate capacitor electrostatic chucks. Electrostatic chucks with two electrodes are referred to as bipolar or integrated electrode electrostatic chucks.

As with the types of chuck designs, the electrostatic attractive force can be generated in different ways. The two types that are commonly employed are Coulombic and Johnsen-Rahbek (JR). JR electrostatic chucks achieve efficient chucking performance through the flow of charges through a dielectric layer. While JR electrostatic chucks exhibit improved performance in terms of chucking and de-chucking response compared to Coulombic electrostatic chucks, a need continues to exist in the art for electrostatic chucks having improved chucking and de-chucking performance.

SUMMARY

According to an embodiment of the present invention, an electrostatic chuck is provided which includes a ceramic body comprising aluminum nitride (AlN), and at least one electrode in the ceramic body. According to a particular feature of this embodiment, the aluminum nitride has a resistivity ratio $\rho_{10V}/\rho_{500V}$ less than about 5. The foregoing resistivity ratio represents the relative disparity in resistivity of the AlN material as a function of applied voltage. In this regard, $\rho_{10V}$ represents the resistivity of the electrostatic chuck at 10 applied volts DC while $\rho_{500V}$ represents the resistivity of the AlN material at 500 applied volts DC.

Preferably, electrostatic chuck has a resistivity ratio less than about 3, and in certain embodiments less than about 2.7.

According to another embodiment of the present invention, a method for processing a semiconductor wafer is provided, which includes positioning a semiconductor wafer on a working surface of an electrostatic chuck as described above, applying power to the chuck to stabilize (i.e., 'chuck') the semiconductor wafer, and subjecting the semiconductor wafer to a processing operation. The processing operation may include deposition, etching, polishing, cleaning, machining, and packaging, for example.

According to yet another embodiment of the present invention, a ceramic component is formed of a composition comprising densified aluminum nitride, the component having a resistivity ratio $\rho_{10V}/\rho_{500V}$ less than about 5. Densification may be carried out by one or a combination of hot pressing, hot isostatic pressing, pressureless sintering.

According to another embodiment of the present invention, a method of forming a ceramic component is provided in which a ceramic body is formed comprising aluminum nitride (AlN), and subsequently heat treating the ceramic body in a heat treatment environment that is substantially free of carbon.

Another embodiment calls for an electrostatic chuck, including: a ceramic body containing AlN; and at least one electrode in the ceramic body, wherein the AlN has a residual voltage not greater than 1.5 volts. The residual voltage is a voltage present in the ceramic body after application of about 10 volts, grounding the ceramic body for about 2 minutes, removing ground, and obtaining a voltage measurement 100 seconds after removing ground.

Another embodiment calls for an electrostatic chuck, including: a ceramic body containing AlN; and at least one electrode in the ceramic body, wherein the AlN has current ratio of $I_{t5}/I_{t400}$ not greater than 2.0. $I_{t5}$ is a first current measurement 5 seconds after application of 10 volts, and $I_{t400}$ is a second current measurement 400 seconds after application of 10 volts.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
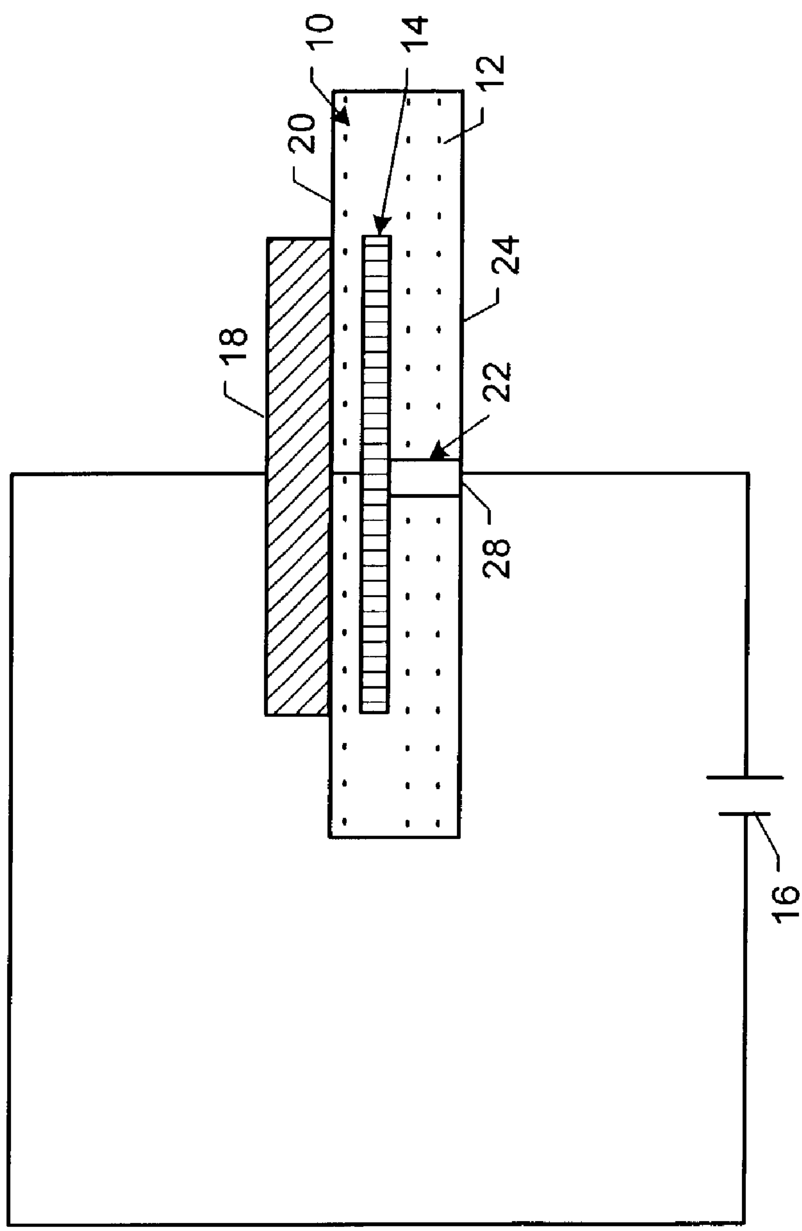
FIG. 1 is a cross-sectional view of an electrostatic chuck according to an embodiment of the present invention.

According to an embodiment of the present invention, an electrostatic chuck is provided which includes a ceramic body and at least one electrode provided in the ceramic body. The ceramic body includes aluminum nitride, which has a resistivity ratio $\rho_{10V}/\rho_{500V}$ less than about 5.

The present inventors have recognized that chucking and de-chucking performance is dependant on the time accumulation and dissipation of the electrostatic attractive force.

The speed at which an electrostatic chuck can accumulate and dissipate the electrostatic charge translates into efficiency and throughput in relation to the use of the electrostatic chuck in a semiconductor fabrication environment. In this regard, the accumulation and dissipation times are related directly to the resistance, or in material terms, the resistivity of the ceramic body at forms a dielectric layer.

Further, higher electrical resistance results in slower charge accumulation, and accordingly, longer times to achieve sufficient attractive force once the voltage is applied. A higher electrical resistance also results in slower dissipation of the electrostatic charges after the voltage is removed (de-chucking). These residual charges can be significant enough to continue to provide an attractive force on the wafer.

The foregoing electrostatic chuck according to an embodiment of the present invention has a specific resistivity ratio to address chucking and de-chucking performance. In particular, the ratio represents the relative difference between resistivity at low voltages (i.e., resistivity at 10 volts, $\rho_{10V}$), versus resistivity at high voltages (i.e., resistivity at 500 volts, $\rho_{500V}$). By providing an aluminum nitride material having reduced low voltage resistivity (specified as a $\rho_{10V}$) relative to high voltage resistivity, improved chuck operation is realized. In particular, improved de-chucking is realized by speeding the dissipation of electrostatic charges following removal of voltage or applied power.

While improved chuck operation may be realized by providing a resistivity ratio $\rho_{10V}/\rho_{500V}$ less than about 5, even further improvements may be realized at lower ratios, such less than about 3. In particular, the ratio may be less than about 2.7, and further, less than about 2.5. In particular embodiments, the resistivity ratio is less than about 2.3 such as less than about 2.0. The present inventors have provided particular embodiments having such a ratio which is below 1.8, such as below 1.5, 1.4 or even 1.3.

The resistivity ratio is a material characteristic of the ceramic body in sintered form, that is, is a characteristic or property of the AlN material itself in sintered form. Particularly, the resistivity ratio may be based on a relatively thin layer of the dielectric material forming the ceramic body, such as about 1 mm. In this regard, the spread of resistivity between high and low voltages becomes more apparent or problematic as thickness of the aluminum nitride dielectric material is reduced, such as a 1 mm thin section of material described above. Thus, it is particularly notable that embodiments of the present invention have a low resistivity ratio as described above even at such reduced thicknesses.

The nominal resistivity or target resistivity of the aluminum nitride ceramic body is typically specified to be within a range of about 1E8 to about 1E14 ohm-cm. In certain embodiments, the nominal resistivity is generally less than about 1E11 ohm-cm. The term "nominal resistivity" generally refers to the target resistivity, such as average resistivity of the material over an expected temperature operating range and over an expected applied voltage range. For example, nominal resistivity may indicate the average resistivity of the material (in sintered form) over a temperature range and over a voltage range as specified by the end user of the material, depending on intended environment. Such ranges may be nested within a range of about −40° to about 150° C. and within a range of about 0 volts to about 500 volts.

According to a preferable feature of the electrostatic chuck, the ceramic body forming the dielectric layer comprises aluminum nitride, and preferably is formed principally of aluminum nitride (e.g., greater than about 70 wt %, such as greater than about 80 wt %). Aluminum nitride is a material of choice for the electrostatic chuck due to its intrinsic electrical properties, high thermal conductivity, high corrosion resistance, and good thermal expansion match with silicon, and in particular, single crystal silicon which forms the semiconductor wafers used during semiconductor processing.

Turning to FIG. 1, a schematic diagram of an electrostatic chuck 10 is illustrated. Electrostatic chuck 10 includes chuck body 12 and electrode 14 embedded in the chuck body 12. Although a single electrode 14 is illustrated, multiple electrodes, as well as heating elements may be implemented as well. During operation, electrostatic chuck 10 is positioned by mechanical supports (not shown) in a process chamber. Voltage from power supply 16 is applied between electrode 14 and a workpiece 18, (generally, a semiconductor wafer), thereby securing the workpiece 18 onto the working surface or chucking surface 20 of the electrostatic chuck 10.

Following the chucking operation, the wafer is subjected to a processing operation, particularly, in conventional semiconductor processing operation, which includes, but is not limited to, deposition, etching, polishing, cleaning, machining, and packaging. After completion of the processing operation, power is cut from the electrostatic chuck to initiate de-chucking. Thereafter, the semiconductor wafer may be removed from the electrostatic chuck by a manual or automated means which are generally understood in the art of semiconductor processing.

The electrode 14 is generally embedded within the chuck body 12, which aids in protecting electrode 14 from corrosive gases present in various process chambers during semiconductor fabrication. Typically the distance between the embedded electrode 14 and the chucking surface 20 ranges from about 0.5 to about 2.0 mm. The electrostatic chuck 10 can have, for example, a monolithic, layered or laminated structure or other structure suitable for fabricating electrostatic chucks which can accommodate embedding of the electrode within the chuck body.

While the electrode 14 is generally an electrostatic electrode, the device may be configured such that the electrode 14 forms a plasma generating or radio frequency electrode. Electrode 14 can be a foil, perforated foil, solid plate, perforated plate, a mesh, a screen printed layer or have some other configuration that is suitable for incorporation into electrostatic chucks or susceptors. Preferably, the electrode 14 includes molybdenum, tungsten, or combinations thereof. Optionally, the electrode can include additional metals such as nickel, cobalt, and combinations thereof. Other suitable materials include, but are not limited to, tantalum, platinum, rhodium, and hafnium.

Electrical contact 22 extends from the electrode 14, and is provided to make electrical connection with an external power supply 16 through cable 26. While cable 26 is shown to be connected directly to end 28 of electrical contact 22, any suitable connection means may be provided.

Preferably, the composition of the ceramic body and/or processing conditions for forming the electrostatic chuck are addressed to provide the low temperature resistivity characteristics desired according to embodiments of the present invention, as well as desirable overall or nominal resistivity. In one such embodiment, the ceramic body includes not only aluminum nitride, but at least one additive for reducing a low voltage resistivity of the aluminum nitride. This additive may be a rare earth element, such as a rare earth in oxide form. Particular examples include yttria (yttrium oxide). The additive, such as rare earth oxide, is generally present in an amount greater than about 0.5 wt %, which amount is preferable to provide desirable low voltage resistivity characteristics. On the other hand, the content of the additive, such as rare earth oxide, may be limited to be no greater than about 2.0 wt %. The upper limit of the additive may be chosen to prevent undesirable phases within the ceramic body.

It is believed that the rare earth-containing additive may form an intergranular phase, that is, a phase present between aluminum nitride grains. This intergranular phase is understood to be an aluminate phase; in the case of yttria, yttria forms a yttria-aluminate intergranular phase. Although not wishing to be bound by any particular theory, it is believed that the intergranular phase, such as yttria aluminate, is effective to increase the charge carriers present within the crystal lattice of the aluminum nitride, such as by migration of oxygen into the crystal lattice to form a desirable charge-carrying defect. In this regard, it has been found that the low voltage resistivity of aluminum nitride bodies containing an additive as discussed above, is substantially reduced as compared with aluminum nitride bodies without such an additive.

According to another aspect of the present invention, a method is provided for forming a ceramic component, such as an electrostatic chuck. The method includes steps of forming a ceramic body comprising aluminum nitride, and heat treating the ceramic body in a heat treatment environment that is substantially free of carbon. In one embodiment, the ceramic component takes on the form of an electrostatic chuck as described above. This particular method may provide an electrostatic chuck which has a resistivity ratio $\rho_{10V}/\rho_{500V}$ as described above, indicating desirable low voltage resistivity. In addition, the ceramic component may have a resistivity within the range of 1E8 to about 1E14 ohm-cm, preferably less than about 1E11 ohm-cm.

According to a particular feature of the foregoing method, the heat treatment of the ceramic body may be carried out in a carefully controlled environment, namely, an environment which is substantially free of gaseous carbon species. In this regard, it has been discovered that presence of carbon in the heat treatment environment may impact the low voltage resistivity of the resulting ceramic component. That is, by controlling the heat treatment environment, low voltage resistivity may be reduced as compared to samples that are heat treated in an environment that is not controlled.

The manipulation of the heat treatment environment may be carried out in any one of or a combination of particular techniques. For example, the ceramic body may be placed in a refractory fixture which is free of carbon. The refractory fixture may provide a partial barrier to any gaseous carbon species present within the heat treatment environment, so as to provide a localized heat treatment environment surrounding the ceramic body which is substantially free of carbon. The term "fixture" is used herein to indicate any one of various forms of furnace furniture configured to receive and support ceramic bodies, whether in sintered or in green form, for high temperature heat treatment in a furnace. In one particular embodiment, the refractory fixture is in a form of a crucible, such as a nitride crucible. In this case, the crucible is typically boron nitride.

The heat treatment environment may be manipulated in other ways. For example, the ceramic body may be combined with a refractory powder that is free of carbon. The ceramic body may be placed on or preferably embedded in and covered with the refractory powder. Like the fixture noted above, the refractory powder may be formed of a nitride material. Particular embodiments have been carried out with the use of aluminum nitride powder.

Alternatively, the global environment within the heat treatment furnace may be manipulated so as to provide a substantially carbon free heat treating process. For example, carbon-based heating elements and carbon-based fixtures as well as any lining material may be replaced with non-carbon containing alternatives. Further, the heat treating atmosphere may be principally a controlled gas, such as an inert gas (e.g., nitrogen), which may be under low pressure such as a vacuum.

The foregoing term "substantially free of carbon" generally refers to restriction of carbon sources so as to prevent unwanted reactions with the aluminum nitride ceramic body which otherwise causes unwanted low voltage resistivity behavior. In connection with the refractory fixture as well as the refractory powder, the composition of the fixture and the powder is chosen from a high purity source (e.g., semiconductor-grade nitride powders). The fixture in the powder typically has a carbon impurity content less than about 1,000 ppm, typically less than about 500 ppm.

The heat treating step is typically carried out at an elevated temperature which is effective to reduce the nominal resistivity of the ceramic component. This temperature is generally greater than about 1800° C., and a typical heat treating temperature is within a range of about 1800° C. to about 2000° C.

In one embodiment, the ceramic body which is subjected to heat treating, is provided in densified form. That is, prior to heat treating, the ceramic body may be a substantially fully dense ceramic body, such that heat treating is carried out strictly to adjust the nominal resistivity of the ceramic body, while preventing undesirable low voltage resistivity changes without any further appreciable densification.

Prior to heat treating, the ceramic body may be formed utilizing conventional forming techniques, which include pressing, slip casting, molding, etc. However, typically the ceramic body is formed by pressing, and in a preferable embodiment, the ceramic body is hot pressed at a temperature so as to effect densification. In this case, temperatures typically are within a range of about 1400° C. to about 1800° C. At these temperatures, it has been found that the precursor material to the ceramic body may be exposed to carbon-containing molds, for example. However, at elevated temperatures, such as on the order of 1900 to 2000° C., exposure to carbon-containing hot pressing implements or molds may cause undesirable low voltage resistivity behavior, and should be avoided.

While the foregoing has mentioned use of hot pressing to form a fully dense ceramic body, which is subsequently heat treated to adjust the nominal resistivity of the ceramic body, it is also conceivable that the forming and treating steps are combined to be carried out simultaneously. For example, the heat treatment and forming steps may together be carried out in a hot pressing operation utilizing components that are substantially free of carbon.

The raw material used for the aluminum nitride portion of the electrostatic chuck and/or ceramic component is typically a high purity aluminum nitride which is suitable for use in a semiconductor fabrication environment. This is often referred to as "semiconductor-grade" material, which has a total impurity content less than about 1,000 ppm total impurities, generally less than 500 ppm, such as less than 350 ppm total impurities. Such a material may be provided by manufacturing the aluminum nitride powder via the known carbo-thermal reduction process, which is a gas-phase process for high purity applications.

While much of the foregoing discussion has referenced the resistivity ratio of the AlN body, embodiments of the present invention may have desirable capacitive characteristics, where the AlN body is not an effective charge storage structure. In one embodiment, the electrostatic chuck has an AlN body which has a residual voltage not greater than 1.5 volts. The residual voltage is a voltage present in the ceramic body after application of about 10 volts, grounding the ceramic body for about 2 minutes, removing ground, and obtaining a voltage measurement 100 seconds after removing ground. Other embodiments may have even less charge storage, in particular, have residual voltages less than about 1.0 volts, such as less than about 0.8 volts and less than about 0.5 volts. A particular embodiment has less than 0.3 volts.

In another embodiment, the AlN body has current ratio of $I_{t5}/I_{t400}$ not greater than 2.0. Here, $I_{ts}$ is a first current measurement 5 seconds after application of 10 volts, and $I_{t400}$ is a second current measurement 400 seconds after application of 10 volts. Other embodiments may have a current ratio less than about 1.8, such as less than about 1.5 or even 1.3.

EXAMPLES

For Example 1, 1.0% $Y_2O_3$ and 99.0% AlN by weight were mixed together in a non-aqueous (methanol) suspension and then dried. The powder was then cold pressed to form the green body. In particular, first a layer of AlN/$Y_2O_3$ powder was cold pressed at 700 psi to form and flatten the initial ceramic layer of the electrostatic chuck (ESC). A screen printed bi-polar molybdenum layer provided as a precursor to form an electrode was then placed on top of the initial layer followed by additional AlN/$Y_2O_3$ powder. The entire body was then cold pressed together at 700 psi to form the entire green body. After the cold press step, the body was then hot pressed at 1700° C. for 2 hours under a pressure of 3000 psi (200 kg/cm$^2$) and in a nitrogen atmosphere to densify and sinter the green body.

After a machining step to clean and flatten the surfaces, the dense body was heat treated in order to reduce the electrical resistivity. During the heat treatment, the body was placed in an enclosed boron nitride crucible and surrounded by AlN powder. The temperature of the heat treatment was 1900° C. for a hold of 2 hours in a nitrogen atmosphere.

After the heat treatment the body was again machined so as to clean and flatten the surfaces. The overall geometry of the Example 1 was machined to have be 3" in diameter, and have a thickness of 3 mm. The dielectric layer, the ceramic layer between the embedded electrode and the top surface of the electrostatic chuck, and between the embedded electrode and the bottom surface a thickness of 2 mm.

Figure 2:
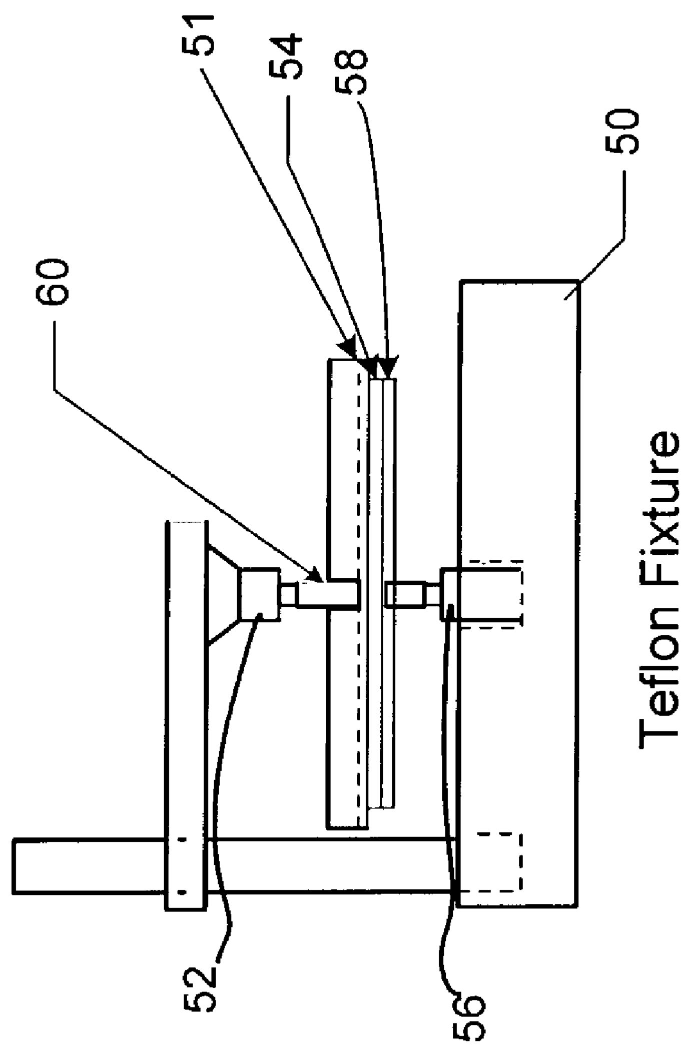
FIG. 2 is a schematic of electrical test setup for resistivity measurements of the dielectric layer in an ESC.

Turning to FIG. 2 for analysis of the electrical resistivity of the dielectric layer, both halves of the bi-polar electrode 51 were exposed by machining an access hole 60 from the bottom of the ESC. Electrical contact was then made with the embedded electrode 51. Both halves of the electrode 51 were connected together and then connected to the positive source 52 of an electrometer. A wet towel electrode 54, of similar diameter to the embedded electrode, was placed on the top surface of the ESC and connected to the negative terminal 56 of the electrometer through an intermediate brass plate 58 and gold coated molybdenum pin. During the measurements, the desired voltage was applied between the embedded electrode 51 and the wet towel 54 on the top surface of the ESC for a specified length of time. After the desired time of electrification, the current was recorded and the dielectric layer's resistivity was calculated. Electrical measurements of dielectric materials, such as AlN, may be dependant on time. For example, on application of a potential difference to a specimen, the current through it generally decreases with time toward a limiting value. The time required to approach this minimum value could vary from a few seconds to hours. Therefore it is important to specify the time of electrification used during the measurement. Often, the time required to approach the minimum value is also voltage dependant. Generally, longer times of electrification are required as the applied voltage is decreased. During the electrical measurements of the dielectric layer in the ESC, the voltage was varied from 10V to 1000V. The specific voltages and times of electrification used are listed in Table 1.

TABLE 1

| Applied Voltage (V) | 10 | 35 | 50 | 125 | 300 | 500 | 1000 |
|---|---|---|---|---|---|---|---|
| Time of electrification (min) | 8 | 6 | 6 | 4 | 2 | 1 | 1 |

Figure 3:
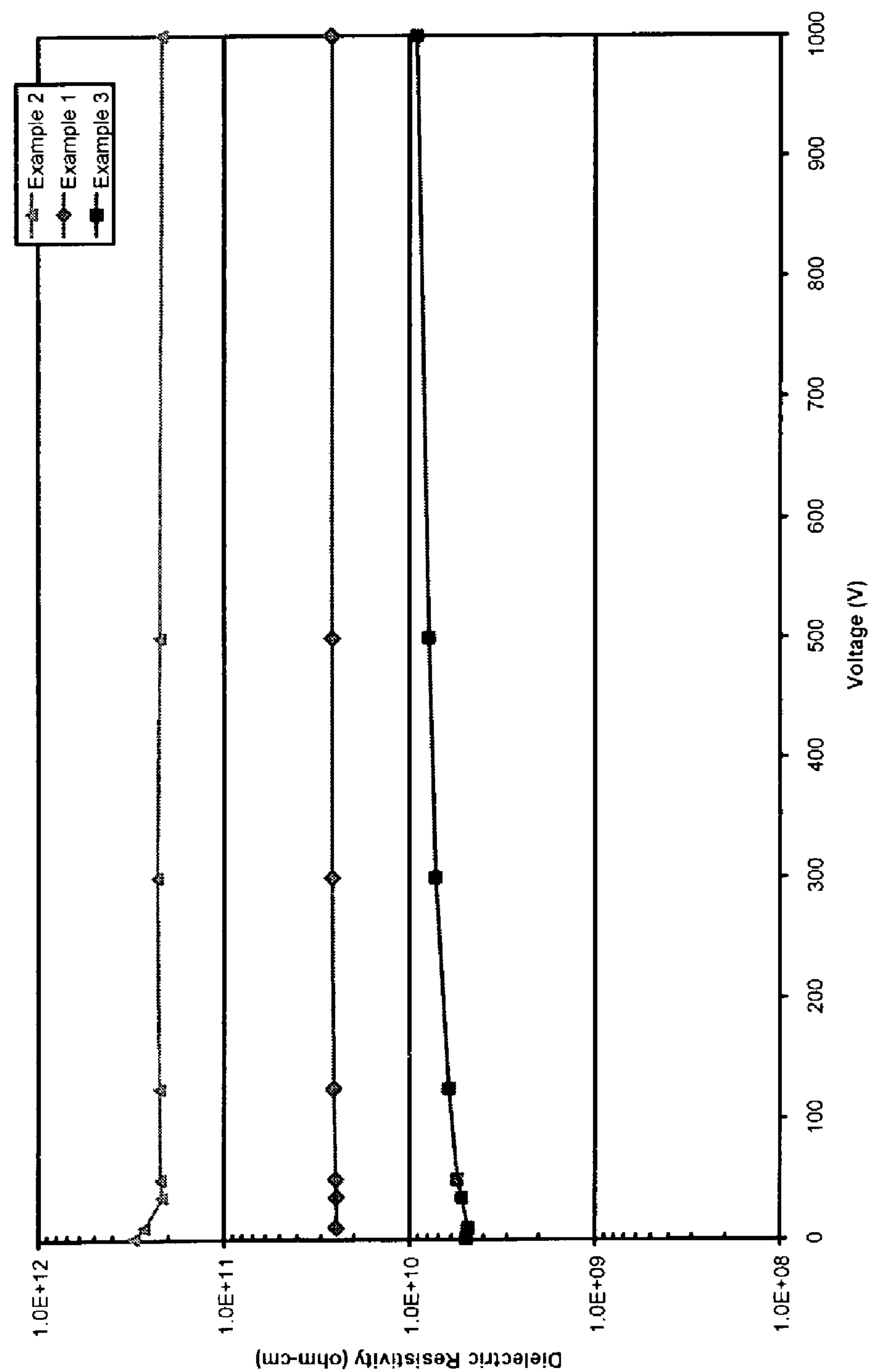
FIG. 3 illustrates the resistivity as a function of voltage for the dielectric layers in several examples of ESCs.

The resistivity as a function of applied voltage for Example 1 is show in Table 2 and FIG. 3.

For Example 2, the ESC was prepared and characterized in the same manner as the previous example, except the $Y_2O_3$ content was decreased from 1.0% to 0.5%. The dielectric resistivity results are shown in Table 2 and FIG. 3.

For Example 3, the ESC was prepared and characterized in the same manner as the previous example, except, the $Y_2O_3$ content was increased from 1.0% to 1.5%. The dielectric resistivity results are shown in Table 2 and FIG. 3.

As can be seen from the data, the resistivity ratio $\rho_{10V}/\rho_{500V}$, representing resistivity dependency on voltage for each of the samples is desirably low. In particular, Example 1 has a resistivity ratio $\rho_{10V}/\rho_{500V}$ of 0.96, Example 2 1.23, Example 3 0.62.

TABLE 2

| | Resistivity | | |
|---|---|---|---|
| Voltage (V) | Example 1 (Wcm) | Example 2 (Wcm) | Example 3 (Wcm) |
| 10.0 | 2.5E+10 | 2.7E+11 | 4.9E+09 |
| 35.0 | 2.5E+10 | 2.2E+11 | 5.3E+09 |
| 50.0 | 2.5E+10 | 2.2E+11 | 5.6E+09 |
| 125.0 | 2.6E+10 | 2.2E+11 | 6.2E+09 |
| 300.0 | 2.6E+10 | 2.3E+11 | 7.2E+09 |
| 500.0 | 2.6E+10 | 2.2E+11 | 7.9E+09 |
| 1000.0 | 2.6E+10 | 2.2E+11 | 9.1E+09 |

In addition to resistivity as a function of voltage measurements, embodiments of the present invention have improved current as a function of time and dielectric absorption properties.

Electrical measurements of dielectric materials, such as AlN, are often time dependant. For example, on application of a potential difference to a specimen, the current through it generally decreases with time toward a limiting value. The time required to approach this minimum value could vary from a few seconds to hours. Therefore the measured current as a function of time is an important material characteristic. The current as a function of time data were collected during the measurements of material resistivity utilizing the apparatus shown in FIG. 2.

First, a comparative example, Example 4, was prepared in the same manner as Examples 1-3, except as follows. Example 4 contained no resistivity modifying additives such as yttria. In addition, Example 4 was hot pressed at a temperature of about 850° C., and heat treated in a furnace without isolation from existing carbon in the heat treatment atmosphere, in argon. Example 4 was heat treated in a furnace having graphite furniture as is known in the art. The geometrical configuration of Example 4 was identical to Examples 1-3.

Figure 4:
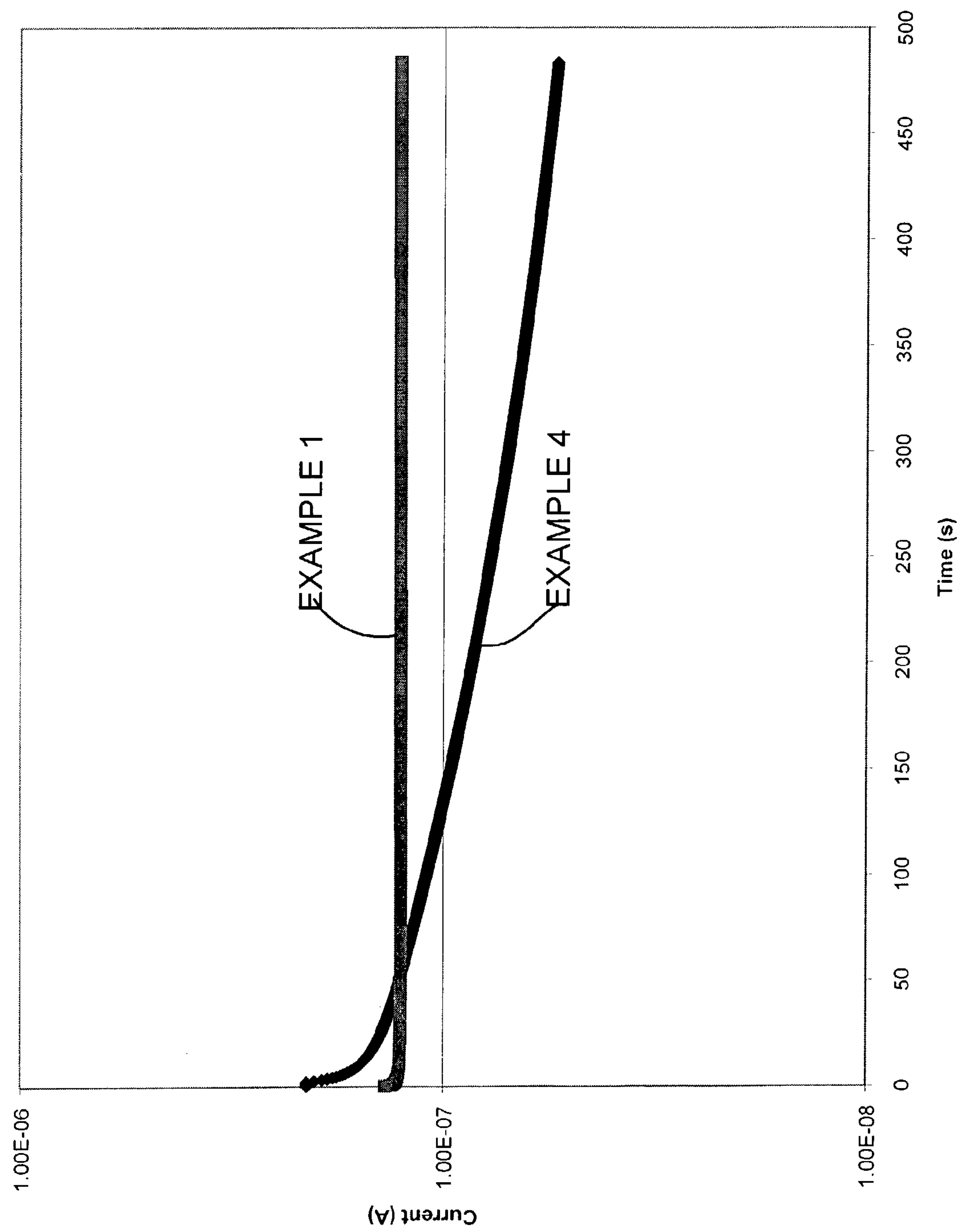
FIG. 4 illustrates current as a function of time for various examples.

During the measurements, the desired voltage (10V) was applied between the embedded electrode and the wet towel on the top surface of the ESC for a specified length of time. The current was recorded continuously while the voltage of 10V was applied. Typical current as a function of time behavior is shown in FIG. 4. Example 4 displayed a decaying current as a function of time, which indicates resistivity increasing with time. Decreasing current with time is due to dielectric polarization in the material, which may result in stored charge, or capacitance, in the material. Stored charge in ESC is not desired because it may affect the release of the wafer after the applied voltage is removed. In contrast, the time dependency current characteristics for Example 1 are also shown in FIG. 4. Example 1 displays a relatively constant current, and therefore resistivity, with time. Example 1 behaves more like an ideal resistor and with minimal charge storage in the material.

At time=5 seconds, the current ($I_{t5}$) of Example 1 was measured to be 1.27E-7, while $I_{t400}$=1.28E-7. Example 1 demonstrated a current ratio of $I_{t5}/I_{t400}$ of 1.0. On the other hand, at time=5 seconds, the current ($I_{t5}$) of Example 4 was measured to be 1.75E-7, while $I_{t400}$=5.43E-8. Example 4 demonstrated a current ratio of $I_{t5}/I_{t400}$ of 3.2.

During the measurement of dielectric absorption the ESC sample was connected to an electrometer in a similar fashion to the resistivity measurement. However, a conductive rubber electrode was used in place of the wet towel electrode. The dielectric absorption was measured by applying a voltage (10V) to the specimen for two minutes, removing the voltage and connecting the specimen to ground for the next two minutes, and finally connecting the specimen to a voltmeter, without an applied voltage, for an additional two minutes. The voltage in the material was monitored during the entire six minute test. During the first two minutes, the measured voltage was equal to the applied voltage, during the second two minute interval the measured voltage was zero since the specimen was connected to ground. During this time, some of the charge in the material was allowed to drain from the specimen. The voltage that was then measured during the final two minute interval an indication of the remaining charge in the material that did not drain from the specimen while it was connected to ground. The voltage measured during this interval was therefore an indication of the stored charge in the material. The results from several dielectric absorption measurements on several samples are displayed in FIGS. 5 and 6.

Figure 5:
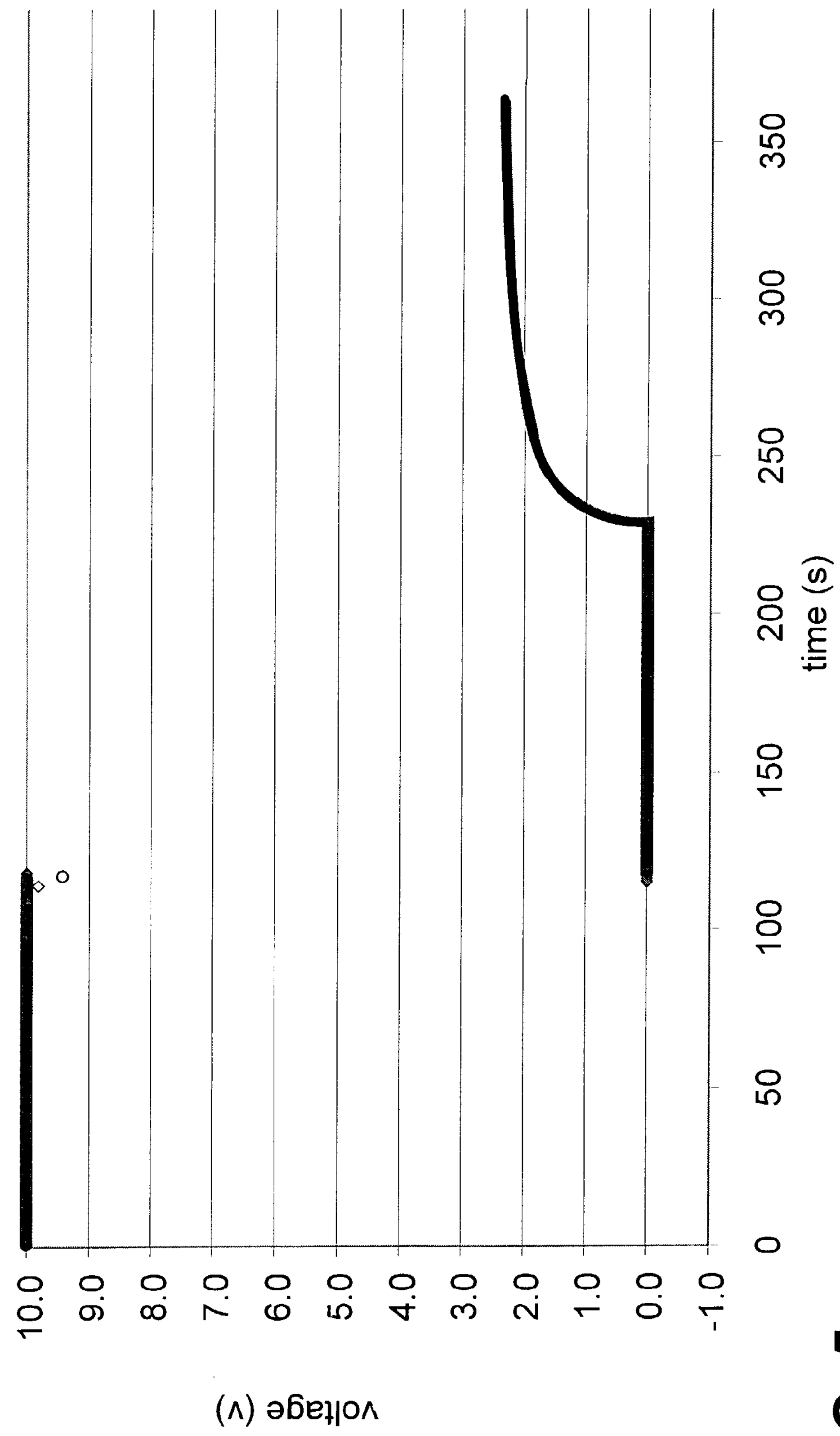
FIG. 5 illustrates residual charge in a comparative example.
Figure 6:
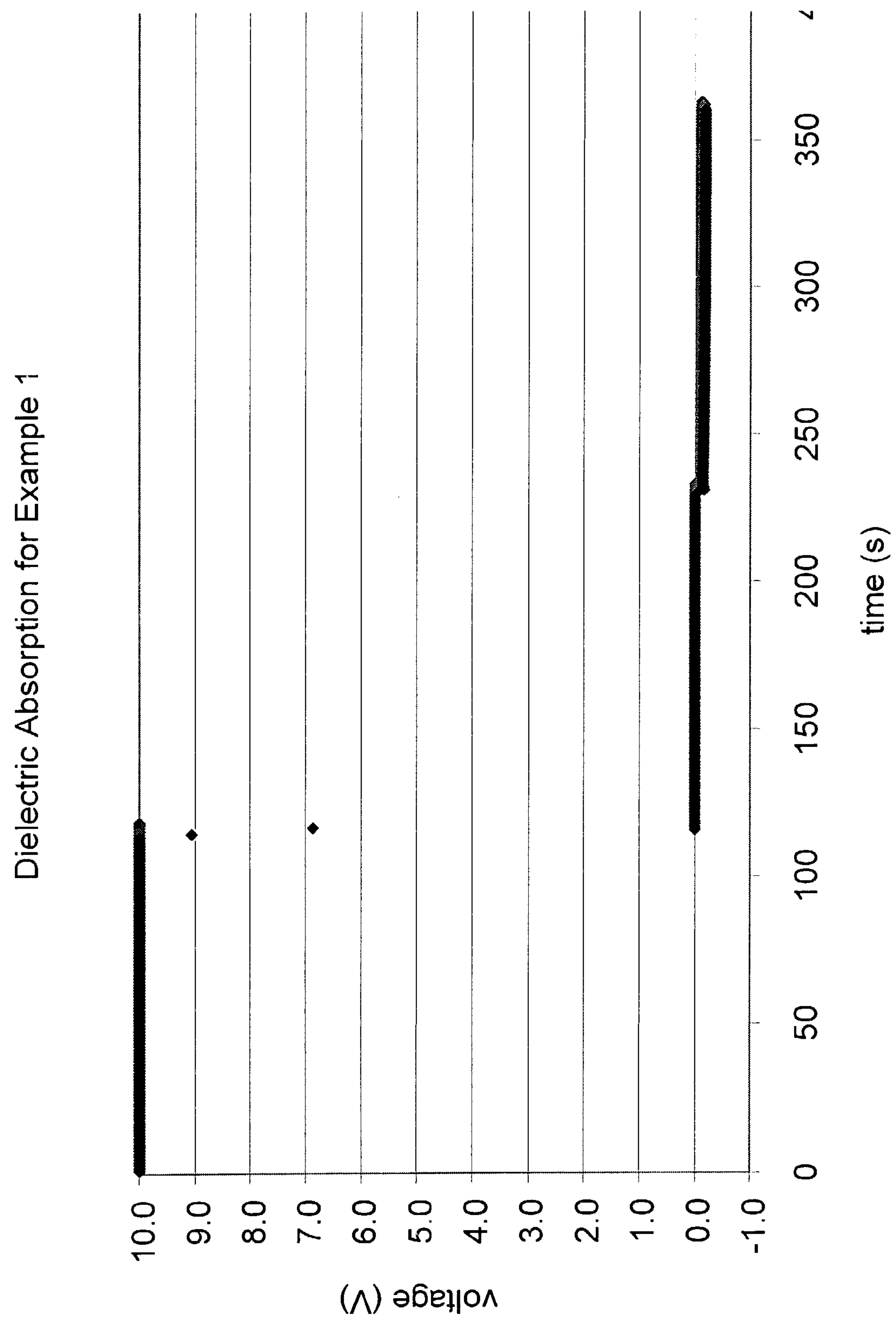
FIG. 6 illustrates residual charge in an example of the present invention.

FIG. 5 shows several dielectric measurements from Example 4. After the final two minute interval, there was approximately 2V remaining in the material, 20% of the initial applied voltage. FIG. 6 displays dielectric absorption measurements for Example 1. The results from these tests show that the improved material retains very little charge. Virtually the same results were measured for Examples 2 and 3.

According to the foregoing description, various embodiments of the present invention have been described with particularity. However, it is understood that one of ordinary skill in the art may make modifications to the processes and articles described above yet still be within the scope of the present claims.

What is claimed is:

1. An electrostatic chuck, comprising:

a ceramic body comprising AlN and at least one additive for reducing restivity of the AlN, the additive comprising rare earth oxide;

and at least one electrode in the ceramic body, wherein the AlN has a resistivity ratio $\rho_{10V}/\rho_{500V}$ less than 3, and has an average resistivity of not greater than 1E11 ohm-cm over an operating temperature range of the electrostatic chuck, the operating temperature range extending up to a temperature of not greater than 150° C.

2. The electrostatic chuck of claim 1, wherein the resistivity ratio is less than about 2.7.

3. The electrostatic chuck of claim 1, wherein the resistivity ratio is less than about 2.5.

4. The electrostatic chuck of claim 1, wherein the resistivity ratio is less than about 2.3.

5. The electrostatic chuck of claim 1, wherein the additive comprises yttria.

6. The electrostatic chuck of claim 1, wherein the rare earth oxide is present in an amount of greater than 0.5 wt %.

7. The electrostatic chuck of claim 1, wherein the rare earth oxide is present in an amount of no greater than about 2.0 wt %.

8. The electrostatic chuck of claim 1, wherein additive is present within grain boundaries of an aluminum nitride crystal lattice to form an intergranular phase.

9. The electrostatic chuck of claim 8, wherein said intergranular phase comprises an aluminate phase.

10. The electrostatic chuck of claim 1, wherein the additive is effective to increase charge carriers within a crystal lattice of the AlN.

11. The electrostatic chuck of claim 1, wherein the ceramic body comprises a working surface for receiving a semiconductor wafer.

12. The electrostatic chuck of claim 1, wherein the AlN has the average resistivity is greater than 1E8 ohm-cm.

13. The electrostatic chuck of claim 1, wherein said resistivity is measured at 500 volts.

14. The electrostatic chuck of claim 1, wherein said resistivity is measured based on a 1 mm thickness of the ceramic body comprising AlN.

15. A ceramic component formed of a composition comprising densified AlN, the ceramic component having a resistivity ratio $\rho_{10V}/\rho_{500V}$ less than 3 and an average resistivity of not greater than 1E11 ohm-cm over an operating temperature range of the electrostatic chuck, the operating temperature range extending up to a temperature of not greater than 150° C.

16. The ceramic component of claim 15, wherein the component further comprises at least one additive for modifying a resistivity of the component.

17. The ceramic component of claim 16, wherein the additive comprises a rare earth oxide.

18. An electrostatic chuck, comprising:

a ceramic body comprising AlN and at least one additive for reducing restivity of the AlN, the additive comprising rare earth oxide in an amount greater than 0.5 wt. % and not greater than 2.0 wt. %; and at least one electrode in the ceramic body, wherein the AlN has a resistivity ratio $\rho_{10V}/\rho_{500V}$ less than 3.0, and has an average resistivity of not greater than 1E11 ohm-cm over an operating temperature range of the electrostatic chuck, the operating temperature range extending up to a temperature of not greater than 150° C.

* * * * *